United States Patent

Hjortzberg

[11] 4,051,517
[45] Sept. 27, 1977

[54] HYBRID SEQUENTIAL AND CARRIER ENCODED COLOR TELEVISION TRANSMISSION METHOD AND CIRCUITS

[75] Inventor: Bernhard A. Hjortzberg, Mission Viejo, Calif.

[73] Assignee: BASF Aktiengesellschaft, Ludwigshafen, Germany

[21] Appl. No.: 571,706

[22] Filed: Apr. 25, 1975

Related U.S. Application Data

[63] Continuation-in-part of Ser. No. 515,148, Oct. 16, 1974, abandoned.

[51] Int. Cl.² .............................................. H04N 9/36
[52] U.S. Cl. ........................................... 358/15; 358/4
[58] Field of Search ................ 358/4, 9, 8, 12, 11, 358/14, 31, 40, 23, 18, 15; 178/DIG. 3

[56] References Cited

U.S. PATENT DOCUMENTS

| | | | |
|---|---|---|---|
| 2,912,491 | 11/1959 | Teer et al. | 358/15 |
| 3,255,303 | 6/1966 | Kihara | 358/4 |
| 3,507,983 | 4/1970 | Leman | 358/8 |
| 3,702,376 | 11/1972 | Isono et al. | 358/31 |
| 3,729,579 | 4/1973 | DeBoer | 358/4 |
| 3,836,707 | 9/1974 | Murakami | 358/31 |
| 3,858,240 | 12/1974 | Golding et al. | 358/31 |

Primary Examiner—John C. Martin
Attorney, Agent, or Firm—Keil, Thompson & Shurtleff

[57] ABSTRACT

A method and circuits for encoding a color video signal for processing, preferably recording and/or playback of said signal within a limited bandwidth of not more than 3MHz without a separate channel for color information such that one half the sum of two sequential horizontal scan lines of information equals the luminance information of the color video signal and one half of the difference of the said two sequential horizontal scan lines of information equals the chrominance information of the color video signal, wherein a first chrominance signal and a second chrominance signal are contained in two non-overlapping frequency regions.

5 Claims, 6 Drawing Figures

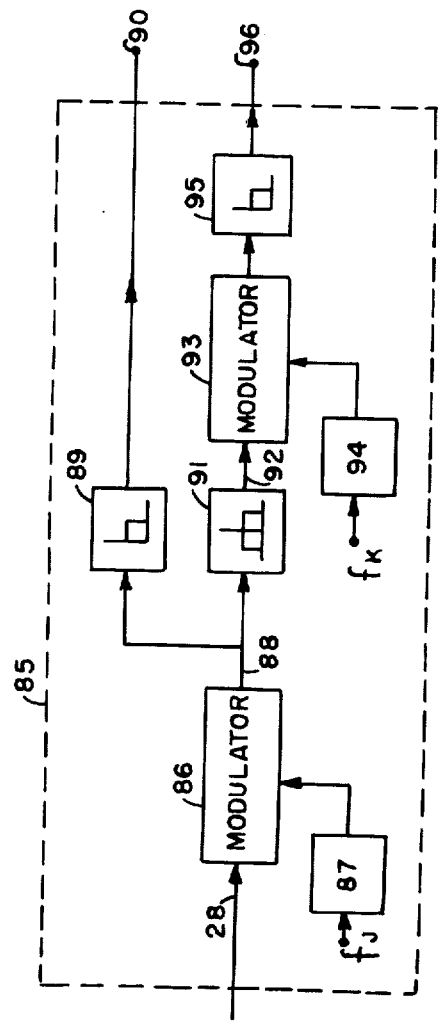

HYBRID SEQUENTIAL AND CARRIER ENCODED COLOR TELEVISION TRANSMISSION METHOD AND CIRCUITS

The present invention is a continuation-in-part of my copending application Ser. No. 515,148, filed Oct. 16, 1974 now abandoned.

BACKGROUND OF THE INVENTION

1. Field of the Invention

The invention relates to the processing and preferably to the recording and/or playback of color video signals within a limited bandwidth of not more than 3 mHz without a separate channel for the color information. More particularly, the invention relates to a method and circuits whereby National Television Systems Committee (NTSC), Phase Alternate Lines (PAL), or other standard broadcast formats are converted into an encoded signal for recording upon a suitable medium, specifically magnetic tape. Upon playback, the required color video broadcast format is reconstituted from the recorded encoded signal. Although the invention relates to the recording and/or playback of color video signals, it is equally applicable to the processing within a limited bandwidth of any modulated broadband signal which also utilizes a modulated subcarrier.

2. Description of Prior Art

It is well known that various colors can be produced by the combination of the three primary colors red, green, and blue in the proper relationship. Color video information, or chrominance information, is broadcast by imposing upon a black and white television signal a modulated subcarrier containing the color difference signals. The NTSC and PAL-M systems use a 3.58 mHz subcarrier for color transmission, while PAL-B uses a 4.43 mHz subcarrier. All these systems employ quadrature modulated color difference signals.

In video recording, there is always present the problem of how to record the color subcarriers. These subcarriers are high frequency; they often have large amplitudes; and their recording and subsequent playback must not introduce phase errors, which result in color changes. Recording of color subcarriers is especially a problem in home video recorders since they are typically designed with limited bandwidth to reduce production costs. Many such video recorders remove the subcarrier with its chrominance information, heterodyne it down to 500 kHz, and record this signal on tape. Two recording channels are used; one is the heterodyned color information, and the other is the luminance signal or information. In such a system, the color information is recorded as an amplitude modulated signal without frequency modulation.

Prior art systems of the kind just mentioned, which use heterodyning-down of the color subcarrier, are deficient from the standpoint of color lock stability and bandwidth on playback—keeping in mind that the recovered color subcarrier must represent the original signal very accurately as to frequency and phase so that proper demodulation in the TV receiver is insured.

Line sequential color television systems are known wherein the NTSC color difference signals are demodulated according to the phase angle of their subcarriers in a predetermined relationship to the phase angle of the color burst synchronization signal included in the video signal transmitted by the TV station. In this regard, see, for example, German Published Patent Application DAS 1,256,686 and U.S. Pat. No. 3,560,635. For the demodulation process of bi- or trisequential signals the use of two or three demodulators is necessary. After demodulation, the color difference signals are filtered by means of two or more filters and, by means of a sequential switch, are converted into line sequential color difference signals. Thereafter, these color difference signals are added to the luminance signal for sequential recording on a tape or disk. During playback, recombination of the video signal is accomplished by a modulator, in place of the demodulators, and one or more delay lines for composing the modulated chrominance and luminance signals.

The main disadvantage of the line sequential recording system is the loss of vertical resolution. This loss is more serious in the areas where the broadcast system utilizes 525 horizontal lines per picture frame such as in the United States as opposed to 625 lines per frame used in Europe. Since one color component is recorded for more than one horizontal line, step function luminance transients will result in color columns because the system requires more than one line to recover and "learn" that the luminance level has changed.

A method and circuits for reducing the loss of vertical resolution in a trisequential color encoding system is known by the German Published Application DOS 2,319,820. In this known method the original color signals R, G, B are so encoded that a luminance information and three color difference signals are attained. During encoding each of the color difference signals is multiplied with a certain factor which is different from the standard factor normally associated to the same color difference signal. Subsequently the color difference signals are trisequentially switched through a low pass filter and thereafter added with the luminance signal in such a way that frequency interlace of the color spectrum lines with the luminance spectrum lines is achieved. In this system a first already expensive color video encoding process is combined with a further expensive encoding system. The high costs of the electronics do not give necessary great advantages so that the system would become applicable in an economical color video recording system.

On the other hand problems concerning the interchangeability of each trisequential system and especially relating to the different numbers of line scans for obtaining a full frame on a television screen cannot be solved without further technical solutions. In this known system the use of a large number of delay lines is a significant drawback on the way to an economical color video processing or an economical recording and/or playback system. The known system has the further great disadvantage that the full color video information is available after four or three line scan periods at the earliest.

Another method of processing the color video signal for recording and playback is disclosed in German Published Patent Application DAS 2,110,104. In this system for recording and playback of color video signals, a carrier is frequency modulated with the luminance, and a subcarrier situated below the luminance FM-frequency range is modulated with at least one chrominance signal. The frequency modulated luminance signal and the modulated chrominance signal are combined and together frequency modulated. The object of this double modulation of the luminance and chrominance signals is to prevent cross talk between the color subcarriers and the luminance signal. This method has the substantial disadvantage of requiring two modulation steps with associated error and increased cost.

The method and circuits described in the present invention use a bisequential recording system. This system is not phase sensitive and overcomes the major problems with the previously known systems as is more apparent from the discussion hereinafter.

SUMMARY OF THE INVENTION

Disclosed is a method and circuits for processing color television video signals within a limited bandwidth of not more than 3 MHz which comprises encoding the color video signals such that one half the sum of two sequential horizontal scan lines of information equals the luminance information of the color video signal and one half of the difference of the said two sequential horizontal scan lines of information equals the chrominance information of the color video signal wherein a first chrominance signal and a second chrominance signal are contained in two nonoverlapping frequency regions. It should be noted that this processing scheme thus differs significantly from a prior art technique in which a quadrature modulated chrominance signal is generated from a chroma signal of standard (NTSC) format by a mixing process using, for example, a 5MHz oscillator and heterodyning the signal down to a 1.5 MHz frequency.

A color video signal can be completely characterized by three components. A convenient choice is luminance and first and second chrominance signals. In the present invention, the luminance information is separated from the chrominance information in the incoming color video signal. The chrominance information is then separated into a first chrominance signal and a second chrominance signal. Preferably the first chrominance signal is transmitted sequentially with alternating polarity, and the second chrominance signal is transmitted as an amplitude modulation on a suppressed carrier. The luminance information and the first and second chrominance signals are combined to yield an encoded signal which is recorded on an appropriate recording medium such as magnetic tapes or disks or piezoelectrically scannable disks or other kinds of video disks.

It is also with advantage possible to transmit both the first and second chrominance signals either sequentially or non-sequentially with amplitude modulation on suppressed carriers. However, since the technique used to transmit either one or both first and second chrominance signals sequentially with amplitude modulation on a suppressed carrier is substantially the same, the improved method and circuits disclosed herein are first discussed with the first chrominance signal transmitted sequentially with alternating polarity and the second chrominance signal transmitted as an amplitude modulation on a suppressed carrier. A simplified method and circuit for transmitting both chrominance signals non-sequentially with amplitude modulation on suppressed carriers is also presented. This is done for ease of description and is in no way intended to limit the invention disclosed.

The average of two scan lines of the encoded signal yields the luminance information, and half the difference between at least two adjacent scan lines of the encoded signal contains the two chrominance signals separated in the frequency domain. The polarity of the chrominance is transmitted by suitable methods by means of an identification pulse or burst. The frequency of the suppressed carrier is an odd multiple of one half of the horizontal line frequency. This definition of the carrier frequencies makes possible that the frequency spectral lines of both chrominance signals become frequency interlaced with the frequency spectral lines of the luminance information.

The decoder employs a simple comb filter — the sum channel of which yields luminance information and the difference channel yields the chrominance information. In one preferred embodiment, the polarity of the first chrominance signal is alternated sequentially. The second chrominance signal is not alternated sequentially, and can be demodulated with the aid of a locally regenerated subcarrier, locked to an identifying signal. In a second preferred embodiment, both chrominance signals can be demodulated with the aid of locally regenerated subcarriers locked to an identifying signal. In either embodiment the three signals may be matrixed or reencoded to yield any of the prevailing local broadcast formats.

It is an object of the present invention to allow the processing of color video information within a limited bandwidth while circumventing the problems of the known methods of recording such information.

Another object of the invention is the provision of a universally encoded recording medium permitting playback on apparatus intended for broadcast standards other than those used at recording.

A further object of the invention is to provide a universal method and circuits for color encoding applicable to all standard video broadcast formats internationally used.

Another object of the invention is to provide a method and circuits which allow the accurate recording and/or playback of color video information in an easy and an inexpensive manner.

Additional objects of the invention will be apparent to those skilled in the art upon consideration of the complete specification.

BRIEF DESCRIPTION OF THE DRAWINGS

FIG. 6 is a block diagram of a simplified color video encoding system.

DESCRIPTION OF THE PREFERRED EMBODIMENTS

Figure 1:
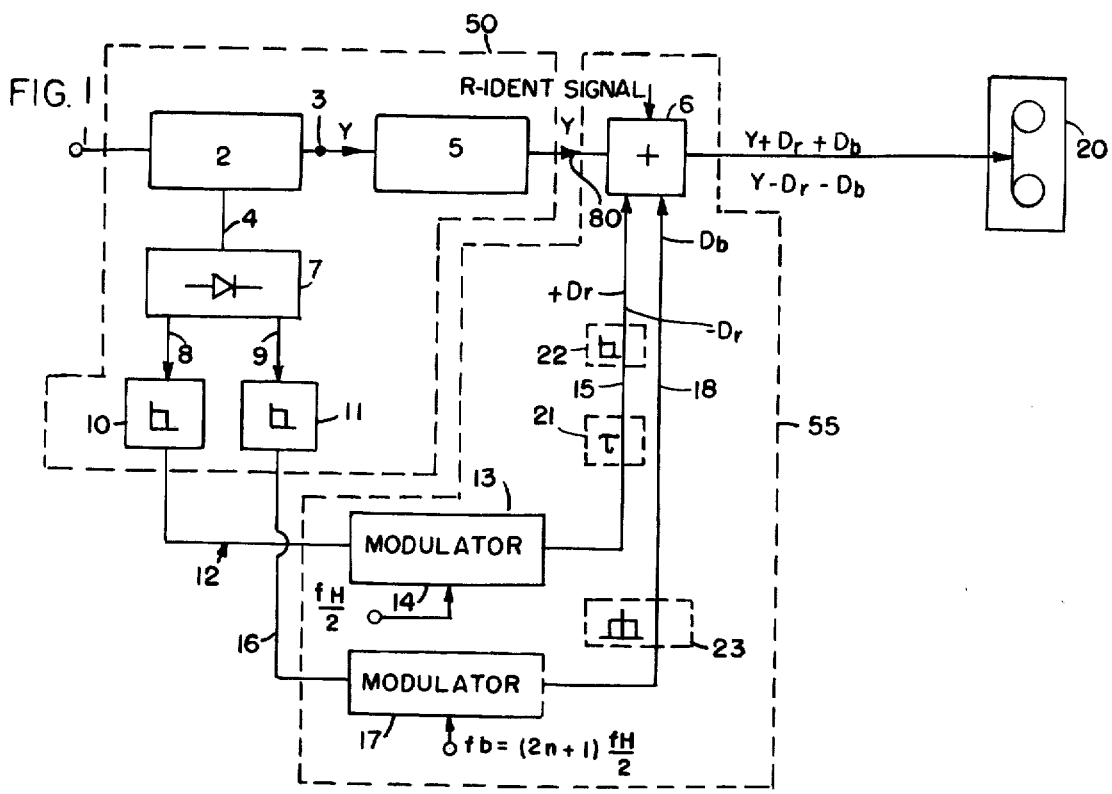
FIG. 1 is a block diagram of the color video encoding system.

A color video signal is completely characterized by three components. A convenient choice is luminance or brightness information denoted by Y; a first chrominance component, $D_r$, which is equal to $k_1(R-Y)$ and a second chrominance component, $D_b$, which is equal to $k_2(B-Y)$. The first chrominance component, $D_r$, contains the red information, and the second chrominance component, $D_b$, contains the blue information. From $D_r$ and $D_b$ a third chrominance component, $D_g$, which contains the green information, may be derived. The constants $k_1$ and $k_2$ relate to the adjustment of the color components to yield an encoded signal of the same dynamic range as a black and white signal has. The factors conveniently are chosen to be $k_1 = 0.30$ and $k_2 = 0.11$. It is advantageous to average two horizontal scan lines of the luminance information before forming the encoded signal in order to minimize cross talk from luminance to chrominance information.

In one preferred embodiment of the present invention, the first chrominance signal, $D_r$, is transmitted sequentially with alternating polarity such that $D_r$ one horizontal scan line delayed is equal to minus $D_r$ at time zero. The second chrominance component, $D_b$, is transmitted as an amplitude modulation on a suppressed carrier. The suppressed carrier frequency, $f_b$, is given by the equation $f_b = (2n+1)f_H/2$. In this instance, $f_H$ is the horizontal line scan frequency. The value assigned to the term $(2n+1)$ must be chosen to give a subcarrier about one third of the FM-carrier frequency in order to minimize beats. A suitable choice for $(2n+1)$ is 135 or 131. This choice results in an $f_b$ of approximately 1 mHz which is for example near the middle of the desired bandwidth of the system where said bandwidth is not greater than 3 mHz and is preferably substantially not greater than 2 mHz. It is further important that $f_b$ be an odd multiple of $f_H$ to allow insertion of the chrominance information between the spectral lines of luminance information during recording.

The second chrominance signal designated as $D_b$ is an amplitude modulated suppressed subcarrier. $D_b$ is a cosine function, $D_b = D_b \cos w_b t$, wherein $w_b$ is the angular frequency and $t$ is time. The cosine function alters polarity between corresponding time $t$ and $t+H$ therefore it is necessary not to alternate polarity of the second chrominance signal, $D_b$.

In another preferred embodiment of the invention, the second chrominance signal $B - Y_L$ amplitude modulates a suppressed carrier of frequency $nf_H$. This AM signal $D_b$ is added to the first chrominance signal $R - Y_L$ and the sum is employed to amplitude modulate a suppressed carrier of frequency $\frac{1}{2}f_H$. The resulting signal contains the same information as is present in the preferred embodiment referred to above.

The encoded signal is both embodiments is therefore given by the equation $$E = Y + D_r + D_b$$

The relationship between the encoded signal at two adjacent scan lines is $$E(0) = Y + D_r(0) + D_b(0)$$

$$E(H) = Y - D_r(0) - D_b(0),$$

since Y, $D_r$, and $D_b$ do not change appreciably from one horizontal scan line to the next. The average of two horizontal scan lines therefore gives luminance because $D_r$ and $D_b$ change signs; the chrominance information cancels. The difference between the encoded signal and the encoded signal one horizontal scan line later gives the chrominance information which must be separated into the first and second chrominance signals. The result of this manipulation is given by the following equations:

$$\tfrac{1}{2}[E(0) + E(H)] = Y$$

$$\tfrac{1}{2}[E(0) - E(H)] = D_r + D_b$$

The above two equations are implemented by a comb filter known to those skilled in the art. The identification of the $D_r$ polarity on each line may be transmitted by a pulse of the proper polarity added to a burst of the subcarrier frequency, $f_b$.

If it is assumed that the bandwidths of $D_b$ and $D_r$ are 0.5 mHz and $(2n+1)$ is equal to 135 or 131, $f_b$ is approximately equal to 1 mHz. Therefore, $D_r$ may be recorded in the frequency range of 0 to 0.5 mHz, and $D_b$ in the range from 0.5 to 1.5 mHz. For correct burst phase, a channel bandwidth of luminance greater than or equal to approximately 2 mHz can be used.

In one preferred embodiment an encoder in a recording channel of a recording/playback system is shown in FIG. 1. A standard television broadcast color video signal at terminal 1 is presented to the entrance of a comb filter 2, which consists of one or two delay lines each having a delay period of one horizontal scan period. The color video signal is separated by said comb filter 2 into a luminance information, Y, at the first output terminal 3 and a chrominance information at the second output terminal 4. The luminance signal Y goes then to a preprocessing stage 5 which is only necessary to be used if the comb filter 2 is not a wideband filter, for instance when its bandwidth is chosen only to 1 mHz. In this case the preprocessing stage 5 is necessarily a second comb filter having a bandwidth of at least 1.5 mHz.

When the comb filter 2 however consists of a wideband delay line, as a glass delay line for example, having a bandwidth from 3 to 7 mHz for instance, a preprocessing stage 5 is not necessary and the Y-signal goes directly to a first of three input terminals of an adder 6.

The chrominance information occurring at the second output terminal 4 of the comb filter 2 is fed to the entrance of a demodulator 7 which yields at the output terminals 8 and 9 the demodulated color difference signals ($R-Y_L$) and ($B-Y_L$) respectively. Each of the output terminals 8 and 9 is connected to one of two low pass filters 10 and 11, which limit the bandwidth of the color difference signals ($R-Y_L$) and ($B-Y_L$) below an upper frequency of 500 kHz for instance.

It can be seen from the dashed lines in FIG. 1 that the components thus far discussed, with the exception of adder 6, comprise a signal separator 50. The components enclosed in block 55 comprise the encoder (to be discussed hereinbelow).

The output line 12 of the ($R-Y_L$) low pass filter 10 is then connected to the entrance of a first double balanced modulator 13, which transmits the first chrominance signal $D_r = (R-Y_L)$ line-sequentially with alternating polarity. For this purpose the modulator 13 has a second entrance terminal 14 to which half the frequency of the horizontal frequency $f_H$ is fed. As shown in FIG. 1 at the output line 15 of the modulator 13 the signals $+D_r$ and $-D_r$ occur line sequentially. Output line 15 is connected to a second entrance terminal of an adder 6.

As described before the second chrominance signal ($B-Y_L$) is also led through a low pass filter 11 and thereafter presented by its output line 16 to a second double balanced modulator 17 by which a subcarrier having the frequency $f_b$, which is e.g. chosen to about 1 mHz, is AM-modulated with the chrominance signal ($B-Y_L$). The modulated signal is indicated as $D_b$ and has a cosine form as described above. The subcarrier frequency $f_b$ has a frequency value according to the equation $(2n+1)$ $f_H/2$ wherein $f_H$ is the horizontal frequency of the recorded TV signal.

At the output line 18 of the double balanced modulator 17, which is connected to the third entrance of adder 6 there occurs the modulated second chrominance signal $D_b$, which has the same form in each line scan period and which in this example must not be phase-switched as signal $D_r$.

With an R-phase-identification signal fed thereto the adder 6 provides at its output line 19 the line sequential signals $Y_m + D_{r_M} + D_{b_M}$ (for line $m$) and $Y_{m+1} - D_{r_{M\ 1}} - D_{b_{M\ 1}}$ (for line $m+1$). These line sequential signals are recorded on a suitable video recording medium for instance a video tape on a tape recorder 20 after suitable prerecording processing of the signals such as FM-modulation. $Y_m$ and $Y_{m+1}$ are the complete Y-high plus Y-low signal of the line $m$ or line $m+1$ respectively.

As indicated with dotted lines in FIG. 1 output lines 15 and 18 can contain additional stages 21–23. These stages can be used instead of low pass filters 10 and 11 in the output lines 8 and 9 of demodulator 7. Stage 22 in output line 15 is a low pass filter and stage 23 in line 18 is a bandpass filter. By these two stages the frequency limitation of the two chrominance signals (R-$Y_L$) and (B-$Y_L$) can be achieved. In this case, when filters 10 and 11 are omitted, an additional long time delay means 21 must be necessarily used in order to compensate a signal delay difference occurring between the lines 15 and 18.

Figure 2:
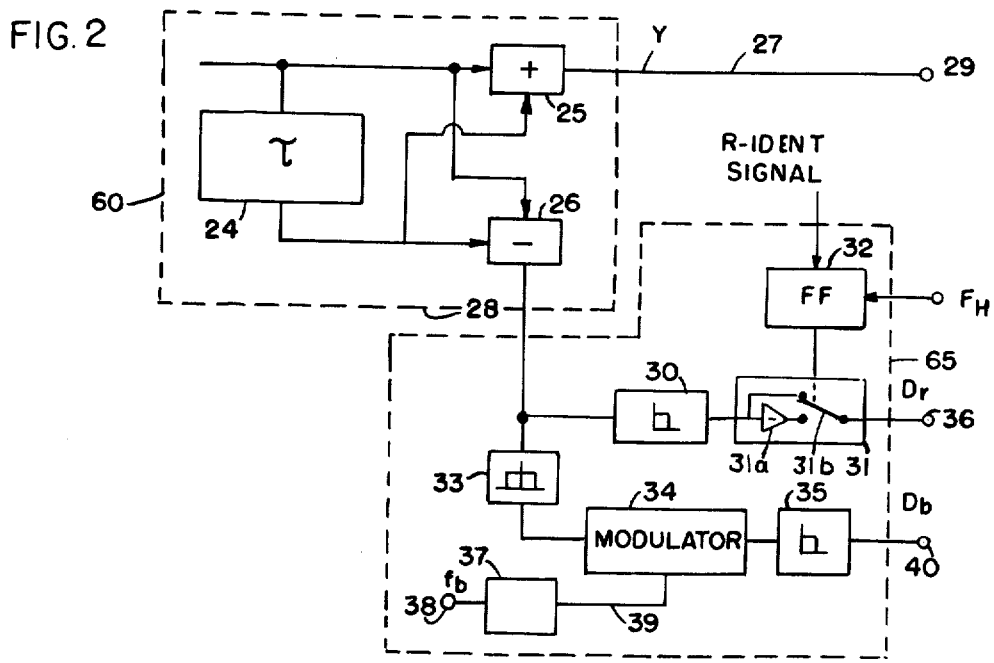
FIG. 2 is a block diagram of the video decoding system.

The decoding process of the encoded recorded signals of FIG. 1 can be carried out by the circuitry shown as a block diagram in FIG. 2. Luminance and chrominance signals are separated in signal separator 60. The previously encoded signal is presented to a wide band delay line 24, adder 25 and to difference stage 26 by way of the delay line 24. The bandwidth of the delay line 24 is preferably greater than 2 mHz and the delay period is equal to one horizontal line scan period.

Adder 25 and difference stage 26 both include dividing-by-two-means.

At the output line 27 of the adder 25 then occurs half the sum of the signals $Y_m + D_{r_M} + D_{b_M}$ (line $n$ delayed for one line scan period) plus $Y_{m+1} - D_{r_{M\ 1}} - D_{b_{M\ 1}}$ (line $n+1$ undelayed) equals $\frac{1}{2}(Y_m + Y_{m+1})$ if the conditions $D_{r_M} - D_{r_{M\ 1}} = 0$ and $D_{b_M} - D_{b_{M\ 1}} = 0$ are fulfilled. This luminance signal is used for line $m+1$. At the output line 28 of the difference stage 26 half of the difference of the foregoing signals occurs, $$\frac{1}{2}\left[ D_{rm} + D_{rm+1} + D_{bm} + D_{bm+1} \right]$$

if the condition $Y_m - Y_{m+1} = 0$ is fulfilled. This chrominance information is used for line $m+1$.

In other words the output signal of adder 25 is the luminance information of two adjacent lines and the output signal of difference stage 26 is the first and second chrominance information of two adjacent lines.

The luminance information is available at output terminal 29 of the circuit. The chrominance information occurring at line 28 is to be reconstituted in a first channel by low pass filter 30, switch means 31 and flip-flop 32 and in a second channel by bandpass 33, and a demodulator consisting of a double balanced modulator 34 and a low pass filter 35. Switch means 31 comprises a conventional inverter 31A and a switch 31B controlled by the output from flip-flop 32.

In the first channel of decoder 65 the chrominance signal $D_r$ is frequency separated from signal $D_b$ by the low pass filter 30 having an upper frequency limit of 500 kHz for instance, and then line sequentially switched by the switch 31, which is triggered by the flip-flop 32 in order to convert the previously alternated phase. A color difference signal R-$Y_L$ is available at terminal 36 of the circuit. It is clear from the foregoing that the flip-flop 32 must have as a reference information the same R-identification signal used in recording (FIG. 1) fed thereto. The flip-flop 32 serves as a divider-by-two-stage for the horizontal line scan frequency $f_H$ and triggers the switch 31 on the red chrominance signal having the right phase.

The composite chrominance information at output line 28 is also presented to a band pass filter 33 having a bandwidth between 0.5 and 1.5 mHz for instance. Band pass filter 33 could also be a high pass filter passing frequencies above that frequency region, e.g. 500 kHz, at which the first chrominance signal is recorded. The output of band or high pass filter 33 is connected to a double balanced modulator 34 and to a phase locked loop 37. The phase locked loop 37 can be locked in a suitable manner to the polarity identifying pulse or the carrier frequency presented to phase locked loop 37 at terminal 38. The output of the phase locked loop 37 (line 39) triggers the double balanced modulator 34. The output of double balanced modulator 34 is equalized by a suitable low pass filter 35 and fed to an output terminal 40. At terminal 40 the amplitude demodulated $D_b$ signal is available if the carrier used in demodulating agrees very accurately in frequency and phase with the carrier used in modulating in the recording process.

The three signals Y at terminal 29, $D_r$ at terminal 36 and $D_b$ at terminal 40 may be matrixed or reencoded to yield any of the prevailing local broadcast formats.

Figure 3:
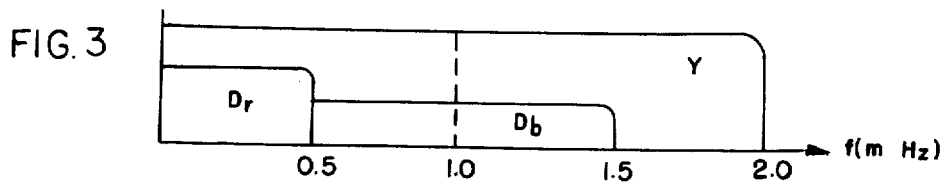
FIG. 3 is a diagram schematically showing the frequency location of the encoded chrominance and luminance information in the circuit of FIG. 1.

For a better understanding of the frequency regions and amplitudes of the encoded signals in the first embodiment, FIG. 3 shows a schematical frequency diagram. Therefrom it will be clear that the $D_r$ signals needs only a bandwidth from 0–0.5 mHz, the $D_b$ signal continues in the bandwidth between 0.5 to 1.5 mHz and the luminance signal Y takes the full frequency range from 0 to 2 or 3 mHz. The position of each of the frequency regions of the encoded $D_r$ and $D_b$ signals can be varied if non-overlapping regions can be achieved. Such variations can be accomplished by suitable combinations of the electronic elements employed, for example by use of delay means having different frequency limits.

Figure 4:
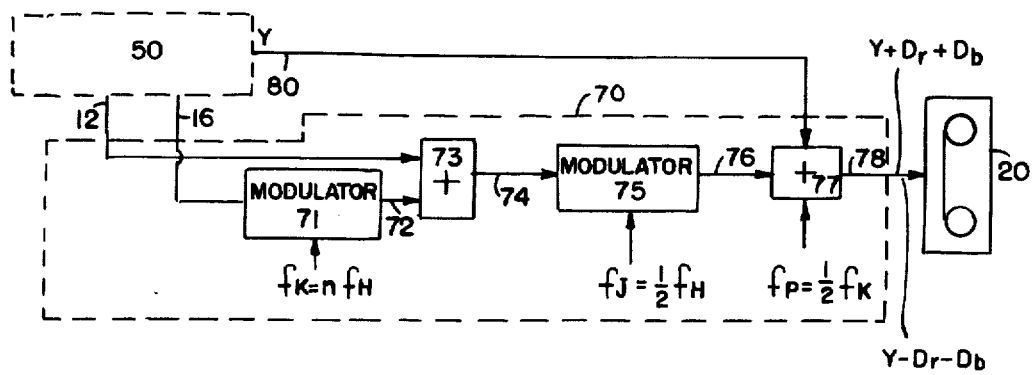
FIG. 4 is a block diagram of a simplified color video encoding system.
Figure 5:
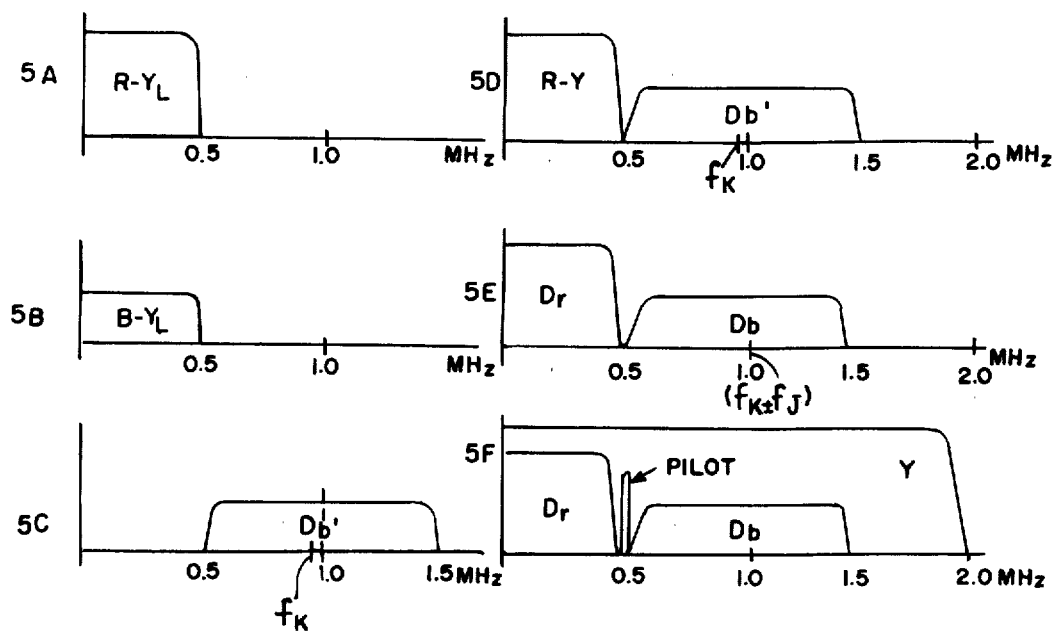
FIG. 5 is a diagram schematically showing the frequency location of the chrominance and luminance information in the circuit of FIG. 4.

FIGS. 4 and 5 illustrate a further embodiment of the encoding portion of the circuit in FIG. 1. FIG. 6 illustrates a corresponding further embodiment of the decoding portion of the circuit in FIG. 2. Signal separator 50 is identical to that described with reference to FIG. 1, supplying luminance signal Y at output terminal 80 and chrominance signals R-$Y_L$ and B-$Y_L$ at output lines 12 and 16, respectively. The bandwidths of these two chrominance signals are shown in FIGS. 5A and 5B. Encoder 70 operates similarly to encoder 55 of FIG. 1, except that the sequence of steps carried out on the chrominance signals has been modified so as to simplify the circuitry required. Signal B-$Y_L$ from line 16 is used to modulate a carrier of frequency $f_k$ in suppressed-carrier type amplitude modulator 71. The carrier frequency $f_k$ is equal to $nf_H$, where $f_H$ is the horizontal scan line frequency and where n is an integer such as 65, 66 or 67 conveniently chosen so that $2n+1$ satisfies the requirement discussed above in connection with the equation $f_b=(2n+1)f_{H/2}$. Hence, a signal $D_b'$ (shown in FIG. 5C) is obtained at output line 72 of modulator 71 which is nearly identical to signal $D_b$ obtained from modulator 17 in FIG. 1. The only difference between $D_b$ and $D_b'$ is that their carrier frequencies are $\frac{1}{2}f_H$ apart, a small difference relative to the frequency $nf_H$. Signal $D_b'$ is added to chrominance signal R-$Y_L$ in an adder 73. The resulting signal appearing at line 74 is shown in FIG. 5D. The combined chrominance signals on line 74 are used to amplitude modulate a carrier of frequency $f_j = \frac{1}{2}f_H$, which gives a signal (FIG. 5E) that is equivalent to the sum of the outputs of modulators 14 and 17 in FIG. 1. Luminance signal Y is added to the chrominance signals in adder 77 and recorder 20 will receive essentially the same signal as in FIG. 1.

It is to be noted that in the embodiment of FIG. 4, at least two advantages are realized over the circuit of FIG. 1. First, rather than supplying carrier frequency $f_b = (2n+1)f_H/2$ to one modulator, the more easily obtained frequency $f_K = nf_H$ can be used. This permits a choice of the type of circuits employed and may allow for more accurate frequencies. Of course, in both embodiments the carrier $f_j = f_H/2$ must be supplied to the other modulator. Second, it is possible to obtain easily a "pilot" frequency $f_p = n/2f_H$ from the carrier $f_K$. The pilot can be inserted between signals $D_r$ and $D_b$ in the encoded signal at adder 77, and then used during playback to synchronize demodulation of the luminance and chrominance signals.

Modifications in the decoder 65 necessary to effect demodulation of the signal encoded by the circuit of FIG. 4 will be apparent to those skilled in the art in view of the foregoing disclosure. For example, the circuit of FIG. 6 would serve to demodulate the chrominance signals when substituted for decoder 65 of FIG. 2. The modulated chrominance signals (FIG. 5E) enter at line 28 and initial demodulation is carried out by a double balanced modulator 86, comparable to modulator 34 in FIG. 2, which is connected to a phase-locked loop 87. The output signal from modulator 88 (FIG. 5D) is fed into two filters. Low pass filter 89 provides the R-$Y_L$ signal (FIG. 5A) at output 90, while bandpass filter 91 passes the $D_b$ signal to modulator 93. Modulator 93 is also of a type comparable to modulator 34 of FIG. 2 and is connected to a phase-locked loop 94. After filtering through bandpass filter 95, the B-$Y_L$ signal appears at output 96 of the decoder. It is to be noted that phase-locked loops 87 and 94 are each phase-locked in the manner described with reference to phase-locked loop 37 in FIG. 2.

It should be once more emphasized that the present encoding/decoding system has the heretofore unattainable advantage that a recording medium carrying the signals encoded according to the invention can be played back on a playback apparatus without subsequently converting the signals for playback on a TV-screen scanned in 525 lines at 30 Hz even when the recording has been performed from a 625 lines/25 Hz TV-system--assuming that the TV scanning display is adapted for alternate scanning rates. By this great advantage of the described system the recording media which carry signals encoded according to this invention are very inexpensive in copying and playback and fully compatible and interchangeable.

However, it is obvious to those skilled in the art to vary the methods and circuits described herein without deviating from the scope of the invention claimed in the appending claims. Theefore, it is not to be intended by the description herein to limit the invention to the disclosed preferred embodiment.

It should be noted, in particular, that while in the second embodiment illustrated and described herein two modulation stages are used in tandem in the encoder, and similarly two demodulation stages in tandem in the decoder, the first chrominance signal R-Y experiences in the second modulation stage a mere polarity reversal so that transmission of the first chrominance signal line-sequentially with alternating polarity is insured. However, it is also possible, instead, to amplitude modulate the first chrominance signal on a carrier frequency—in a manner analogous to the amplitude modulation, in the second embodiment shown herein, of the second chrominance signal B-Y on carrier frequency $f_b$, with the two carrier frequencies chosen so that the two modulated chrominance signals occur in non-overlapping regions of the frequency spectrum. As indicated above, amplitude modulation of both chrominance signals on respective carrier frequencies is also possible as applied to the first embodiment shown herein.

I claim:

1. A circuit for encoding color video signals which comprises:
   a. a comb filter including a delay line and having two output terminals, the first of said output terminals providing the luminance information and the second of said output terminals providing the chrominance information;
   b. a demodulator connected to the second output terminal of the comb filter, which has two output terminals each of which is connected to a low pass filter each having an output terminal the output terminal of one low pass filter providing (R-Y) and the output terminal of the other low pass filter providing (B-Y);
   c. a first double balanced modulator connected to the (B-Y)-low-pass-filter and transmitting a second chrominance signal, $D_b$, as an amplitude modulation on a suppressed carrier;
   d. a first adder having two inputs the first of which is connected to the (R-Y)-low-pass-filter and the second of which is connected to the output of the first double balanced modulator and having an output which provides the sum of signals (R-Y) and $D_b$;
   e. a second double balanced modulator connected to the output of the first adder and transmitting the signal appearing at its input as an amplitude modulation on a suppressed carrier at its output; and
   f. a second adder having two inputs the first of which is connected to the first output terminal of the comb filter and the second of which is connected to the output of the second double balanced modulator, and having an output which provides the encoded signal.

2. In a system for processing of a color video signal, which system has a bandwidth of not more than 3 mHz, an improved method for processing said color video signal to produce an encoded signal, comprising encoding the color video signal, with substantially no loss of luminance information in said bandwidth, so as to produce a line-sequentially encoded signal in which one half the sum of two successive horizontal scan lines of information equaling the luminance information of the color video signal alternates with one half of the difference of the said two successive horizontal scan lines of information equaling the chrominance information of the color video signal;

wherein said chrominance information is represented by a first chrominance signal and a second chrominance signal which are contained in two non-overlapping frequency regions; and wherein the step of encoding the color video signal comprises:
a. separating the luminance information of the color video signal from the chrominance information of the color video signal;
b. demodulating said chrominance information of the color video signal into said first chrominance signal and said second chrominance signal;
c. amplitude modulating a first suppressed carrier by one of said first and second chrominance signals, the frequency of said first carrier being an odd multiple of the video horizontal scan line frequency,
d. combining the other of said first and second chrominance signals with said first amplitude modulated suppressed carrier,
e. amplitude modulating a second suppressed carrier by the signal representing the combination of said chrominance signal and said first amplitude modulated suppressed carrier, the frequency of said second carrier being an odd multiple of one half of the video horizontal scan line frequency, and
f. combining said luminance information of said color video signal with said second amplitude modulated suppressed carrier to produce said signal.

3. A method as in claim 2, wherein the step of encoding the color video signal further comprises the step of combining said luminance information of said color video signal with said second amplitude modulated suppressed carrier and a pilot frequency signal to produce said encoded signal, the frequency of said pilot signal being within the system bandwidth and outside the two non-overlapping bandwidths of said chrominance signals.

4. An apparatus for processing of a color video signal comprising:

a. means for separating the luminance information of the color video signal from the chrominance information of the color video signal;
b. means for demodulating the chrominance information into a first chrominance signal and a second chrominance signal; and
c. means for processing the luminance information, first chrominance signal, and second chrominance signal to form a line-sequentially encoded signal in which one half the sum of two successive horizontal scan lines of the encoded signal equaling the luminance information of the color video signal alternates with one half of the difference of the two successive horizontal scan lines of the encoded signal equaling the chrominance information of the color video signal;

wherein said chrominance information is represented by a first chrominance signal and a second chrominance signal which are contained in two non-overlapping frequency regions; and wherein the means for processing the luminance information, first chrominance signal, and second chrominance signal to form said encoded signal further comprises means for amplitude modulating a first suppressed carrier in dependence on one of said first and second chrominance signals, the frequency of said first suppressed carrier being an odd multiple of the video horizontal scan line frequency, means for combining the other of said first and second chrominance signals with said first amplitude modulated suppressed carrier, means for amplitude modulating a second suppressed carrier by the signal representing the combination of said other chrominance signal and said first amplitude modulated suppressed carrier, the frequency of said second carrier being an odd multiple of one half of the video horizontal scan frequency, and means for combining said luminance information of said color video signal with said second amplitude modulated suppressed carrier, thereby producing said encoded signal.

5. The apparatus of claim 4, wherein the means for combining the luminance information with said second amplitude modulated suppressed carrier further includes means for combining with a pilot frequency signal, the frequency of the pilot signal being within the system bandwidth and outside the two non-overlapping frequency regions of said chrominance signals.

* * * * *